Jan. 8, 1929.  
J. E. HOFFMAN  
1,698,630  
HEADLIGHT CONTROLLING APPARATUS  
Filed May 12, 1927  2 Sheets-Sheet 2
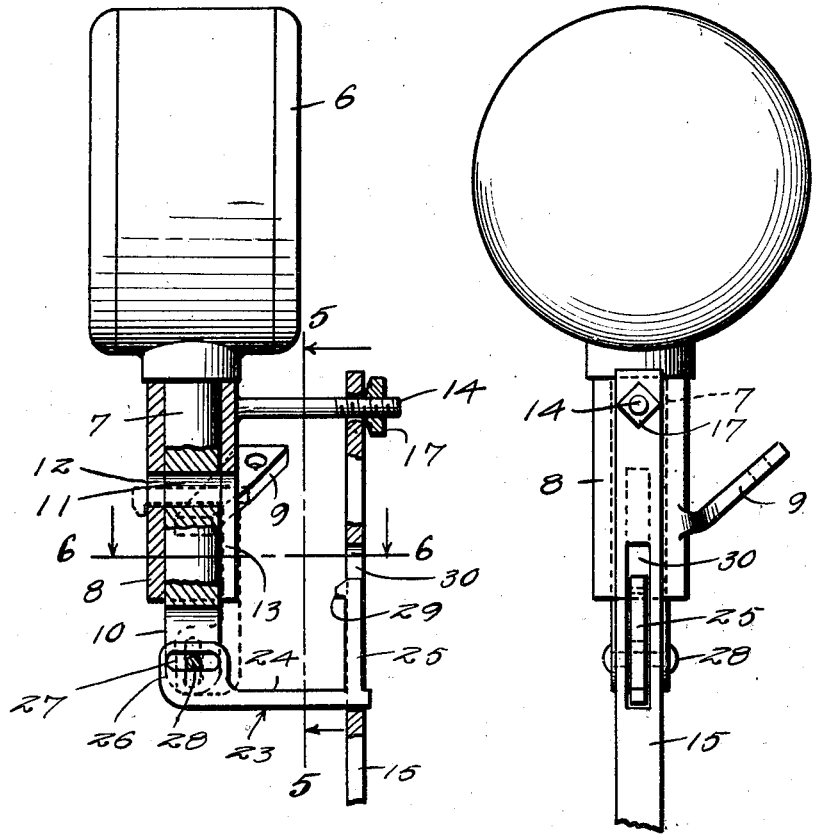
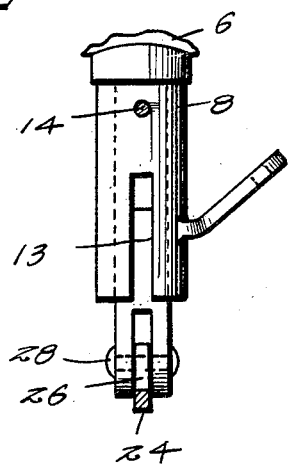
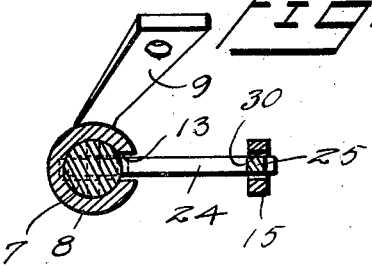
Inventor  
J. E. Hoffman  
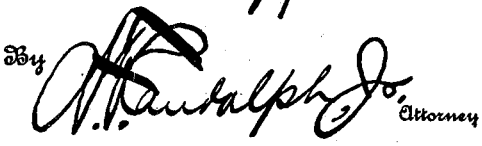
Attorney Patented Jan. 8, 1929.

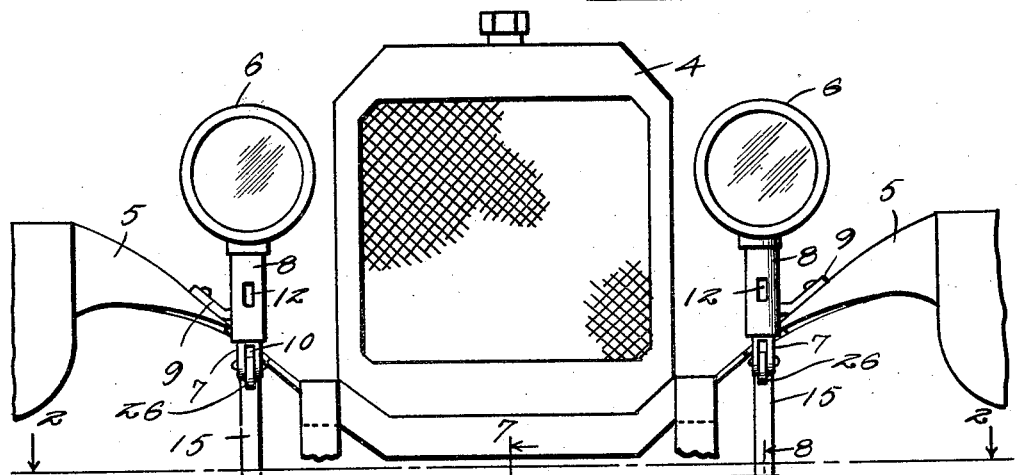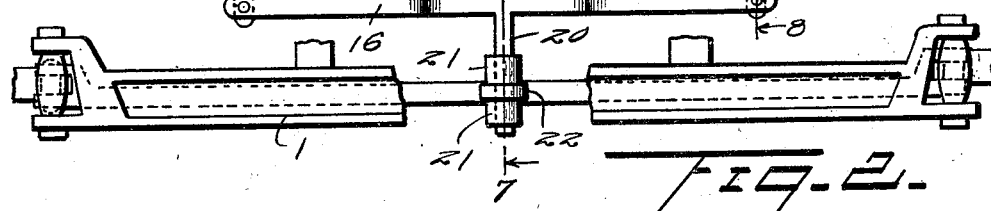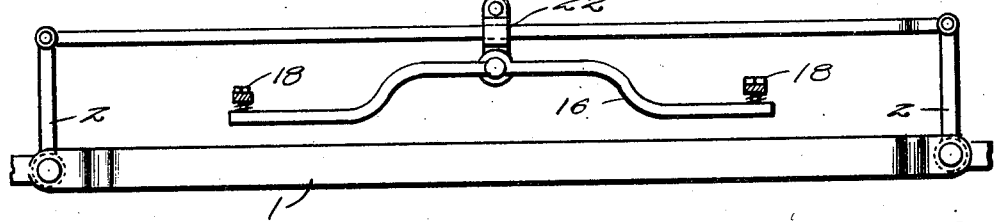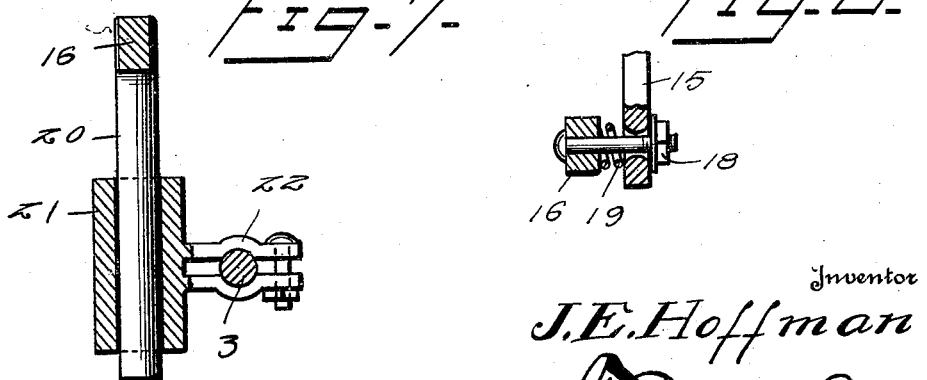

1,698,630

UNITED STATES PATENT OFFICE.

JOHN E. HOFFMAN, OF CASPER, WYOMING.

HEADLIGHT-CONTROLLING APPARATUS.

Application filed May 12, 1927. Serial No. 190,954.

This invention relates to and has for one of its objects to provide a novel, simple and inexpensive apparatus which shall be adapted to place the headlights of an automobile under the control of the steering mechanism so as to insure their pointing in the direction of travel of the vehicle and which shall be adapted to permit the headlights to be readily disconnected from the steering mechanism and secured against movement with respect to the vehicle.

With the foregoing and other objects in view, the nature of which will become apparent as the description proceeds, the invention consists of the construction, combination and arrangement of parts hereinafter fully described and claimed, and illustrated in the accompanying drawings, wherein:

Figure 1 is an elevational view illustrating the application of the headlight controlling apparatus, Figure 2 is a sectional view taken on the horizontal plane indicated by the line 2—2 of Figure 1, Figure 3 is a view partly in side elevation and partly in vertical section of one of the headlights and part of the controlling apparatus therefor, Figure 4 is a view in rear elevation of the parts shown in Figure 3, Figure 5 is a sectional view taken on the vertical plane indicated by the line 5—5 of Figure 3, Figure 6 is a sectional view taken on the horizontal plane indicated by the line 6—6 of Figure 3, Figure 7 is a sectional view taken on the vertical plane indicated by the line 7—7 of Figure 1, and Figure 8 is a similar view taken on the vertical plane indicated by the line 8—8 of Figure 1.

Referring in detail to the drawings, in the several views of which like reference characters denote like parts, 1 designates the front axle, 2 the steering knuckles, and 3 the drag link of an automobile. 4 designates the radiator, 5 the front fenders, and 6 the headlights of the automobile.

In accordance with my invention, the headlights 6 are mounted upon the automobile for rotation about vertical axes, and they are connected to the drag link 3 so as to place them under the control of the steering mechanism of the automobile, whereby to insure their pointing in the direction of travel of the automobile. The headlights 6 are provided with stems 7 which are rotatably mounted in bearing sleeves 8 secured to the automobile by brackets 9. The stems 7 are provided with lower forked ends 10 which extend below the bearing sleeves 8. The stems 7 are provided with radial openings 11 which register with radial openings 12 in the front sides of the bearing sleeves 8 and with the upper ends of axial slots 13 in the rear sides of the bearing sleeves. Arms 14 are secured to and extend rearwardly from the bearing sleeves 8, and levers 15 are pivotally connected at their upper ends to the arms. A connecting bar 16 which is provided with a rearwardly offset central portion, is pivotally connected at its ends to the lower ends of the levers 15. The levers 15 are retained on the arms 14 by nuts 17, and the connecting bar 16 is connected to the levers by bolts 18. Springs 19 are mounted upon the bolts 18 between the levers 15 and connecting bar 16. The connecting bar 16 is provided centrally between its ends with a depending stem 20 which is slidably and rotatably associated with a bearing sleeve 21 secured to the drag link 3 by a clamp 22. The stems 7 are connected to the levers 15 by means of latches 23 each of which comprises right angularly related arms 24 and 25. The arms 24 are provided with ears 26 which are positioned in the slots 10 of the stems 7 and are provided with slots 27 arranged parallel to the arms. Pins 28 carried by the stems 7 and passing through the slots 27 pivotally connect the latches to the stems. The arms 25 are provided with hooks 29 and are positioned in vertical slots 30 formed in the levers 15.

As the headlights 6 are mounted for movement about vertical axes, as the levers 15 are pivotally mounted and connected to the headlights, and as the connecting bar 16 is secured to the levers and to the drag link 3, the headlights are so connected to the steering mechanism of the automobile that they are under the control of such mechanism and will point in the direction in which the automobile is traveling. When it is desired to disconnect the headlights 6 from the steering mechanism of the automobile, and secure them against turning movement, the latches 23 are swung out of engagement with the levers 15 into engagement with the stems 7 and bearing sleeves 8. When the latches 23 are in engagement with the stems 7 and bearing sleeves 8, their arms 24 occupy the slots 13 and their arms 25 extend through the openings 11 and 12 with their hooks 29 in contact with the bearing sleeves, all as indicated by dotted lines in Figure 3. The pin and slot connection between the latches 23 and the stems 7 permits them to be readily engaged with and disengaged from the stems 7 and bearing sleeves 8.

It should be understood that the drawings are merely illustrative and do not pretend to give exact proportions. Furthermore, the said drawings are illustrative of a preferred construction, it being my expectation that various changes and modifications may be made without departing from the spirit and scope of my invention.

What is claimed is:

1. In combination, a relatively fixed bearing sleeve to be applied to an automobile, a headlight-mounting stem journaled in said bearing sleeve, a lever adapted for operation by steering mechanism, a latch pivotally and slidably connected to said stem, said lever having a slot into which said latch is adapted to project to connect the parts for dirigible operation, and said sleeve and stem having slots into which the latch is adapted to extend when a headlight is to remain stationary.

2. In combination, a bearing sleeve adapted to be fixed to an automobile, a stem journaled in said sleeve and adapted to carry a headlight, said sleeve extending below the bearing, a latch having an elongated slot, a pivot element on the sleeve below the bearing passing through said slot to pivotally and slidably connect the latch thereto, said latch having an angularly related arm thereon provided with a hook, a lever adapted for connection to steering mechanism and provided with a slot, said slot receiving said arm when a headlight is to be dirigibly operated, said sleeve having a slot and said post having a slot adapted to aline therewith, and said latch being shiftable to cause said arm and hook to engage the last mentioned slot.

In testimony whereof I affix my signature.

JOHN E. HOFFMAN.